United States Patent Office 3,365,378
Patented Jan. 23, 1968

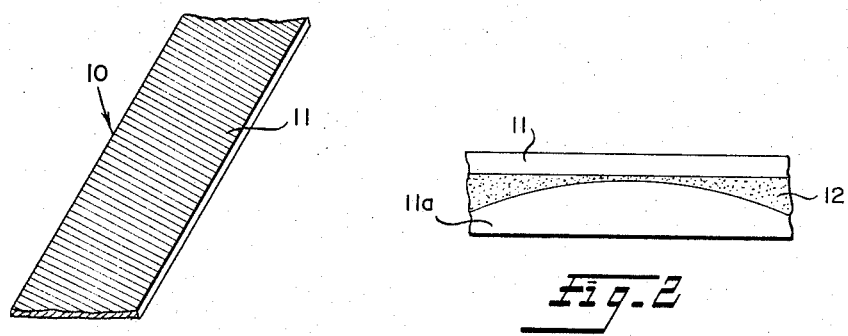
Fig. 1
Fig. 2
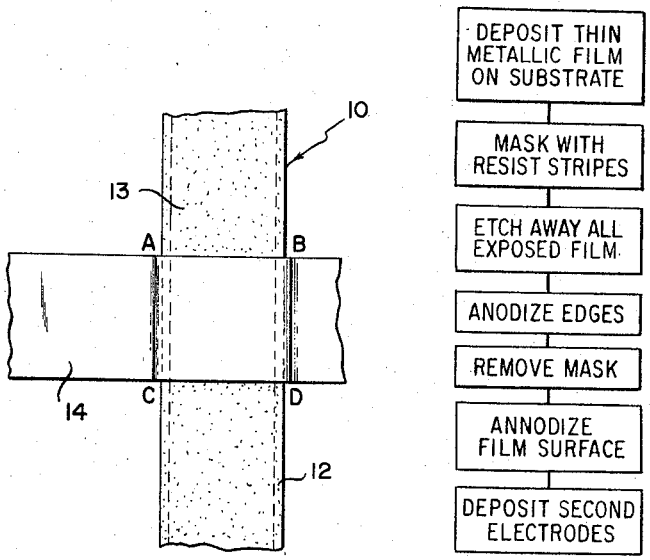
Fig. 3
Fig. 5
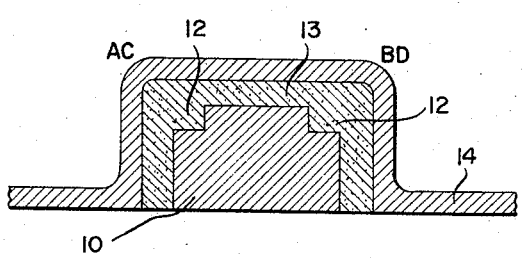
Fig. 4
INVENTORS
Leon I. Maissel
Charles L. Standley

3,365,378
METHOD OF FABRICATING FILM-FORMING METAL CAPACITORS
Leon I. Maissel, Poughkeepsie, and Charles L. Standley, Wappingers Falls, N.Y., assignors to International Business Machines Corporation, New York, N.Y., a corporation of New York
Filed Dec. 31, 1963, Ser. No. 334,856
4 Claims. (Cl. 204—38)

The invention relates to an electrical capacitor, and more particularly it relates to an improved film-forming metal crossed-electrode capacitor.

The film-forming metal capacitors generally employ as one electrode an oxidizable metal selected from the group including tantalum, aluminum, zirconium, titanium, hafnium, niobium, etc. The oxides of these metals are not only easy to form, but they also make excellent dielectric materials which are well suited in the manufacture of capacitors. Another advantage in using these metals lies in the fact that their oxides form tightly adherent, highly impervious dielectric films on the surface of the metal by conventional electrolytic anodizing techniques.

Generally speaking, prior known capacitors employing anodized electrodes of a film-forming metal are of three types: the wet electrolytic capacitor; the solid or dry electrolytic capacitor; and the latest type printed capacitor.

A conventional wet electrolytic capacitor consists of an anodized electrode immersed in a suitable liquid electrolyte. The container that holds the anodized electrode and the liquid electrolyte generally serves also as the second electrode of the capacitor. Such a capacitor has the advantage of healing any imperfections in the dielectric film which are either present initially or which may occur subsequently. But the disadvantages of this capacitor outweigh its advantages. It requires a large amount of liquid electrolyte which makes it bulky and difficult to handle. Moreover, its bulkiness renders it highly unsuitable for a great many modern miniaturized electrical circuits and other like components.

The solid capacitor, developed after the wet capacitor, usually consists of an anodized porous body which is coated first with a layer of manganese dioxide and then with a layer of an electrically conductive metal, serving as the second electrode. The manganese dioxide serves the same purpose as the liquid electrolyte in the wet capacitor, facilitating the healing or rebuilding of imperfections and irregularities in the anodized film. By substituting a solid layer of manganese dioxide for the liquid electrolyte in the wet capacitor, the dry capacitor to a considerable extent overcomes the disadvantages of the former type capacitor. However, as it is, even this capacitor is not small enough to be integrally incorporated in such miniaturized components as the printed circuit, micro-module and the like.

For these purposes the most ideally suitable capacitor is the newest third type capacitor, frequently referred to as the printed capacitor. This newest type capacitor is described in detail in the U.S. Berry Patent No. 2,993,266. Briefly, the printed capacitor is fabricated in a three-step process. In the first step a thin layer of film-forming metal is deposited on a substrate by any of the known techniques such as vacuum evaporation, sputtering, etc. In the second step the film-forming metal layer is electrolytically anodized to produce a dielectric oxide layer. The last step constitutes applying an electrically conductive counter-electrode in direct contact with the dielectric oxide film.

The yield of thin film capacitors made by the above described methods is generally fairly low. The precise reason for this disadvantageous phenomenon is not yet fully understood. However, certain data indicates that the relatively low yield of these devices is due to their tendency to break down rather easily at the edges where the counter-electrode strip passes over the oxidized film-forming metal layer.

The principal object of the present invention, therefore, is to construct an improved electrical capacitor which substantially overcomes these and other defects in known capacitors of the type described above.

Another object of the invention is to form a thin film-forming metal capacitor capable of high yield.

A further object of the invention is to fabricate a crossed-electrode film capacitor with little or negligible leakage currents.

A still further object of the present invention is to construct a thin film crossed-electrode metal capacitor which has its anodized edges intermediate the two metallic electrodes substantially thicker than the remaining anodized surface.

A special object of the invention is to construct a crossed-electrode thin film tantalum capacitor wherein the distance between the two electrodes is greater along the longitudinal edges of the anodized film than along the remaining intermediate area.

Yet another object of the invention is to construct a capacitor having high yield and low leakage currents.

The foregoing and other objects, features and advantages of the invention will be apparent from the following more particular description of a preferred embodiment of the invention, as illustrated in the accompanying drawings.

FIGURE 1 is a perspective fragmentary view of the tantalum film having its upper surface coated with a suitable resist stripes.

FIGURE 2 is a highly enlarged schematic illustration of a metallic film emphasizing the creeping-in of an oxide layer underneath a resist coating upon initial anodization.

FIGURE 3 is an enlarged view of the crossed-electrode capacitor of the invention showing two electrodes positioned transversely to each other after all steps of the process have been performed.

FIGURE 4 is an enlarged cross-sectional elevational view of the crossed-electrode capacitor showing counter-electrode over anodized electrode.

FIGURE 5 is a sequential-step chart of the process.

Broadly, in accordance with the present invention, a film-forming metal layer is first deposited on a suitable substrate. Next a suitable resist is deposited through a suitable mask onto the metallic film. Thereafter all the metal film portions uncovered by the resist are etched away, using a suitable etchant. Then the metal film is anodized while the resist coating is still covering the unetched portions of the film. Theoretically, nothing should happen since the film-forming metal layer is protected by the resist. In practice, however, the electrolyte will creep in very slightly under the resist forming a narrow dielectric layer of thick oxide along each edge of the metal layer. It is believed this narrow layer of relatively thick oxide along the edges of the filming metal strip prevents leakage currents and endows the capacitor with high yield. The resist is now removed and the capacitor is made by the common practice, that is, by anodizing the entire metal film surface and then depositing a thin layer of a suitable metal in direct contact with the dielectric oxide film.

Now, referring more particularly to the drawings, there is depicted in FIGURE 1 a suitable metal film 10 deposited by any of the known techniques, such as vacuum evaporation, sputtering, etc., on a suitable substrate not shown here for clarity. As stated above, the metal layer 10 can be of any of the film-forming metals of the group including tantalum, aluminum, zirconium, titanium, hafnium, niobium, etc. However, in the preferred embodiment we use tantalum. Preferred substrate materials for this invention are glasses, glazed ceramics, and film-forming metals. All other types of refractory materials and high melting-metals that meet the requirements of heat resistance and non-conductivity may also be advantageously employed as a substrate.

Parallel stripes 11 indicate a thin coating of a suitable resist deposited through a suitable mask on the tantalum film 10. After the formation of these resist stripes 11, the tantalum film 10 is subjected to an etching action of a suitable etchant to remove all the metallic portions left uncovered in between the stripes 11. However, the etching of the unprotected metal is not essential to the practice of the invention. This step can be eliminated in processes wherein the deposition of the tantalum is made through a mask on the desired areas only. In such processes, the next step usually is the anodizing of the metal layer in its unprotected state. U.S. Berry patent referred to above uses this process.

At any rate, in prior art methods where the above etching step is employed, after the etching of the metal, the resist coating is removed and thereafter the metallic film is anodized to form a thin uniform dielectric oxide layer on its surface.

In accordance with this invention, the tantalum stripes 11a are subjected to an anodizing treatment while resist stripes 11 are still protecting the metal. Again, as noted above, in theory the resist coating 11 should prevent the formation of any oxide on the tantalum stripes or the like. In practice, however, it has been found an oxide layer 12 creeps in underneath the resist coating 11 a short distance from each edge of the stripes 11a during the anodizing process as emphasized in FIGURE 2. The amount of creep-in that so occurs depends both on the edge anodizing voltage and the conductivity of the electrolyte. This is illustrated in Table I.

TABLE I.—CREEP DURING EDGE ANODIZATION VS. SOLUTION CONCENTRATION

| Volts Anod. | 0.1% Na$_2$SO$_4$ Mils Creep | 30% Na$_2$SO$_4$ Mils Creep |
| --- | --- | --- |
| 20 | 2.2 | 2.0 |
| 30 | 2.6 | 2.0 |
| 40 | 3.9 | 3.1 |
| 60 | 5.7 | 4.3 |

Thus one usually uses a higher voltage in anodizing the protected metal surface than that used to anodize the same metal surface in its unprotected state.

After the formation of the oxide layer 12, the resist coating is removed with a suitable etchant from the stripes 11a and the oxide layer 12. Then the tantalum film 10, formed of thin parallel metal stripes 11a, is once again subjected to an oxidizing treatment so as to cover the entire film with a dielectric layer 13. Finally as shown in FIGURE 3, a conductive counter-electrode 14 of suitable metal is applied transversely in direct contact with the oxide layers 12 and 13. Any commonly used suitable method can be employed for the application of counter-electrode onto the two oxide surfaces provided such method does not mechanically or thermally disturb the dielectric oxide layers 12 and 13. In this configuration of a crossed-electrode capacitor, anodized film 10 and the metal film 14 serve as the two capacitor electrodes, while alphabetical letters ABCD mark the geometrical area where the counter-electrode 14 passes over the anodized electrode 10.

As shown in FIGURE 4, the thin film crossed-electrode tantalum capacitor fabricated in accordance with the present invention has substantially thicker oxide layers on its edges AC and BD than on the remaining area located between the opposing faces of the electrodes 10 and 14. These relatively thick oxide coatings prevent the formation of weak spots along the film edges. In this way, a capacitor is provided possessing high yield and low leakage currents characteristics.

A comparison of the yield of the capacitors of this invention, wherein the film-forming metal layers is subjected to a dual anodizing treatment as described above, with that of the prior known capacitors, which do not employ the edge anodizing step, is illustrated in Table II.

TABLE II

| Anodizing Voltage | Yield of Prior Art Capacitor | Yield of the Capacitor of This Invention |
| --- | --- | --- |
| 16 | 54 | 76 |
| 24 | 48 | 78 |
| 36 | 50 | 60 |

A step flow chart of a preferred process of this invention is shown in FIGURE 5.

Recapitulating, the improved capacitor of this invention may be fabricated as follows:

(i) A filming metal film is deposited over an entire substrate surface.

(ii) The metal film is masked with thin parallel stripes of a resist and all metal not protected by the resist is etched away.

(iii) The protected metal film is anodized on the edges to a voltage substantially higher than that utilized to anodize an unprotected film surface.

(iv) The resist is removed.

(v) The bare metal stripes are anodized to the desired voltage.

(vi) Stripes of a suitable counter electrode material are evaporated through mask transversely to the first metal film.

While the invention has been particularly shown and described with reference to a preferred embodiment thereof, it will be understood by those skilled in the art that various changes in form and details may be made therein without departing from the spirit and scope of the invention.

What is claimed is:

1. The process for producing thin film capacitors comprising:
   depositing a thin metallic film on an electrically non-conductive substrate;
   masking the film with a resist layer defining a pre-determining pattern;
   etching away portions of the film which are exposed through the resist layer, thereby creating a plurality of films having exposed edges;
   oxidizing to a first extent exposed edges of the films, thereby creating an oxide on exposed edges and on portions of faces of the films in contact with the resist layer, which portions are adjacent the edges;
   removing the resist layer,
   oxidizing of the films to a second lesser extent, whereby thicknesses of oxide at exposed edges are greater than the thicknesses of the oxides near centers of a face, of the films; and
   depositing thin film electrodes on oxide surfaces.

2. The process for preparing electrical capacitors having electrodes spaced by an oxide comprising:
   a placing a first metallic electrode upon a substrate;
   covering a surface of the first electrode opposite the substrate, and exposing edges of the first electrode;
   oxidizing to a first extent edges of the first electrode, thereby converting to an oxide edges and portions of the first electrode adjacent the surface and edges;
   uncovering the surface;
   oxidizing the surface;
   thereby creating an oxide layer having a greater thickness on portions of the first electrode adjacent the surface and edges; and
   placing a second electrode on the oxide layer of the first electrode.

3. The process described in claim 2 wherein the first step comprises depositing a metallic thin film upon a nonconductive substrate.

4. The process described in claim 2 wherein the covering step comprises masking a metal film in a predetermined pattern, and etching away all unmasked portions creating a plurality of first electrodes, and wherein the uncovering step comprises removing a mask.

References Cited

UNITED STATES PATENTS

| | | | |
|---|---|---|---|
| 2,668,936 | 2/1954 | Robinson. | |
| 2,695,380 | 11/1954 | Mayer et al. | 317—238 |
| 2,995,502 | 10/1961 | Ramirez et al. | 204—15 |
| 2,682,024 | 6/1954 | Kohman et al. | 317—258 |
| 2,741,730 | 4/1956 | Maylandt et al. | 317—258 |
| 2,516,986 | 8/1950 | Heinse | 204—38 |
| 2,935,453 | 5/1960 | Saubestre | 204—38 |

HOWARD S. WILLIAMS, *Primary Examiner.*

JOHN F. BURNS, JOHN H. MACK, D. J. BADER, W. VANSISE, *Examiners.*